United States Patent
Ros Pérez

(10) Patent No.: US 8,935,017 B2
(45) Date of Patent: Jan. 13, 2015

(54) BRAKING CONTROL SYSTEM AND METHOD

(71) Applicant: EADS Construcciones Aeronauticas, S.A., Sociedad Unipersonal, Madrid (ES)

(72) Inventor: José Luis Ros Pérez, Madrid (ES)

(73) Assignee: EADS Construcciones Aeronauticas, S.A., Sociedad Unipersonal, Madrid (ES)

( * ) Notice: Subject to any disclaimer, the term of this patent is extended or adjusted under 35 U.S.C. 154(b) by 0 days.

(21) Appl. No.: 14/072,927

(22) Filed: Nov. 6, 2013

(65) Prior Publication Data

US 2014/0136026 A1    May 15, 2014

(30) Foreign Application Priority Data

Nov. 6, 2012   (EP) .................................... 12382428

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60T 8/17* | (2006.01) |
| *B60T 8/88* | (2006.01) |
| *B64C 25/42* | (2006.01) |

(52) U.S. Cl.
CPC ............... *B60T 8/1703* (2013.01); *B60T 8/885* (2013.01); *B64C 25/426* (2013.01); *B60T 2270/413* (2013.01)
USPC .............................................................. 701/3

(58) Field of Classification Search
CPC ...... B64C 25/426; B60T 8/885; B60T 8/1703
USPC .............................................................. 701/3
See application file for complete search history.

(56) References Cited

U.S. PATENT DOCUMENTS

| | | |
|---|---|---|
| 7,369,922 B2 | 5/2008 | Garcia |
| 2010/0070150 A1 | 3/2010 | May |
| 2012/0109424 A1 | 5/2012 | Fervel et al. |

OTHER PUBLICATIONS

European Patent Office, Extended European Search Report for European Patent Application No. 12382428.6, mailed Apr. 16, 2013.

*Primary Examiner* — Maceeh Anwari
(74) *Attorney, Agent, or Firm* — Ingrassia Fisher & Lorenz, P.C.

(57) ABSTRACT

A control system and method of the anti-skid computers of an aircraft are provided. The control system comprises two IMA computers, comprising each one an Avionics Computer Control Device, an Avionics Computer Monitoring Device and at least one dual data acquisition means and at least one dual processing means. Each Avionics Computer Control Device and each Avionics Computer Monitoring Device are connected to the anti-skid computers of both sides.

7 Claims, 4 Drawing Sheets

BRAKING CONTROL SYSTEM AND METHOD

CROSS-REFERENCE TO RELATED APPLICATION

This application claims priority to European Patent Application No. EP 12382428.6, filed on Nov. 6, 2012, which is incorporated herein by reference in its entirety.

TECHNICAL FIELD

This application pertains to the field of braking control systems. Specifically, the technical field relates to a control system and method for the elements in charge of avoiding the skidding of an aircraft main landing gear.

BACKGROUND

The main landing gear braking control system of an aircraft has been through a deep evolution. An important step in the design of these devices was including systems which control specifically the skidding of the main landing gear.

With the introduction of IMA architecture (Integrated Modular Avionics) as the responsible of the whole avionics of the aircraft, it has been necessary to develop new methods for controlling the skidding of the main landing gear, that take into account the particular structure of these aircraft control systems.

In these control systems, each anti-skid computer is controlled only by the IMA of its corresponding side. In the systems comprised in the state of the art, the IMA computer of side 1 is exclusively connected downstream to the emergency braking box and with the anti-skid computer of the side 1.

An example of this configuration may be seen in US Patent Publication No. 2012/0109424 A1. In this document, a system where each IMA computer controls its own anti-skid computer is described, embedded in a flight control system for the whole aircraft. It also comprises a failure detector monitoring the anti-skid computers.

This configuration presents a problem, which is the response when a cross failure in the IMA computer and in the anti-skid computer takes place. When the IMA computer is unable to control the anti-skid computer of its side, either due to an error in the connection, or due to an internal error of the IMA computer itself, and the other anti-skid computer is unavailable, the aircraft cannot be braked, as no anti-skid computer can be used to control the action of braking.

Furthermore, if that failure takes place before the aircraft starts its operation, said aircraft could not even be operated, as the anti-skid system is an essential system for its operation.

Other objects, desirable features and characteristics will become apparent from the subsequent summary and detailed description, and the appended claims, taken in conjunction with the accompanying drawings and this background.

SUMMARY

According to one of various aspects, the present disclosure provides a control system of the anti-skid computers of an aircraft, the system comprising: an IMA computer of side 1, comprising an Avionics Computer Control Device of side 1 and an Avionics Computer Monitoring Device of side 1, and including at least one dual data acquisition means and at least one dual processing means; an IMA computer of side 2, comprising an Avionics Computer Control Device of side 2 and an Avionics Computer Monitoring Device of side 2, and including at least one dual data acquisition means and at least one dual processing means; an Anti-skid computer of side 1; an Anti-skid computer of side 2; and Main landing gear control elements. The Avionics Computer Control Device of side 1 and the Avionics Computer Monitoring Device of side 1 are connected to the Anti-skid computer of side 1, and the Avionics Computer Control Device of side 2 and the Avionics Computer Monitoring Device of side 2 are connected to the Anti-skid computer of side 2, characterized in that each Avionics Computer Control Device and each Avionics Computer Monitoring Device are further connected to the anti-skid computers of the other side.

Advantageously, if one of IMA computers fails, both anti-skid computers can be controlled, so if a cross failure takes place (i.e., the failure of one IMA computer and the failure of the other side's anti-skid computer), the anti-skid system will not be unavailable (anti-skid systems from the state of the art would be), but the operating IMA computer will be able to control the operating anti-skid computer even though they belong to different sides. This cross failure was absolutely critical in the systems comprised in the state of the art, so if this happened while the aircraft was in the air, the main landing gear may not be properly braked; and if this happened while the aircraft was still on ground, this failure prevented the aircraft from being operated.

Thus, a braking control system according to the various teachings of the present disclosure solves two problems: first, if the failure takes place while the aircraft is being operated, the aircraft will be able to be braked, because both anti-skid computers can be controlled by the operative IMA side. Secondly, if the failure takes place on ground, the aircraft may be operated, as the operative IMA side handles the control of both anti-skid computers.

In one exemplary embodiment, the control system of one of various aspects, further comprises at least one of these elements: at least one communication bus; a bus switch of side 1, connecting the IMA computer of side 1 to the at least one communication bus, or a bus switch of side 2, connecting the IMA computer of side 2 to the at least one communication bus.

In one embodiment, the control system of one of various aspects further comprises an Emergency Brake Analogue Box connected with both anti-skid computers, with both Avionics Computer Control Device and with both Avionics Computer Monitoring Device.

In one exemplary embodiment, in the control system of one of various aspects, the anti-skid computers govern the wheels of the main landing gear of an aircraft.

In another of various aspects, the present disclosure provides a method of solving a fault processing raising a fault message in a control system of the anti-skid computers of an aircraft according to various aspects, comprising determining using data inputs whether the IMA computer side is invalid, and then if true, deactivating the IMA computer side; and if false, verifying if the IMA computer side is degraded.

In one exemplary embodiment, the method according to various aspects further comprises: if the IMA computer side is degraded, checking if the other IMA computer side is valid, then if true, deactivating first IMA computer side; and if false, checking the active anti-skid computer. The method further comprises if the IMA computer side is not degraded, checking if the fault message has been incorrectly raised, and then if true, invalidating and then deactivating the IMA computer side; and if false, checking if the active anti-skid computer is invalid.

In one exemplary embodiment, the method according the various aspects further comprises: if the active anti-skid computer is invalid, checking the other anti-skid computer; invalidating and then deactivating the IMA computer side if the other anti-skid computer is invalid too, or reconfiguring the system to the other anti-skid computer if said other anti-skid computer is not invalid; if the active anti-skid computer is not invalid, checking if the active anti-skid computer is degraded; if true, checking if the other anti-skid computer is valid, reconfiguring the system to the other anti-skid computer if said other anti-skid computer is valid or not reconfiguring the system if said other anti-skid computer is not valid; and if false, not reconfiguring the system.

Advantageously, in this method, no IMA side change is necessarily required, but this change may be replaced by an anti-skid computer change.

In addition, this exemplary method includes eventually determining a "conditioned validity" of the IMA side. This is previous to determine the validity of active antiskid validity (70), and was not carried out in the analogue step of former method. In addition, the new method also includes a "degraded processing decision" (120).

In one of various aspects, the present disclosure provides an aircraft landing gear the brakes thereof are governed by a control system according to various embodiments.

In another of various aspects, the present disclosure provides an aircraft comprising a control system according to various embodiments.

A person skilled in the art can gather other characteristics and advantages of the disclosure from the following description of exemplary embodiments that refers to the attached drawings, wherein the described exemplary embodiments should not be interpreted in a restrictive sense

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The present disclosure defines a control system of the elements in charge of controlling the skidding of the wheels in the main landing gear of an aircraft.

Figure 1:
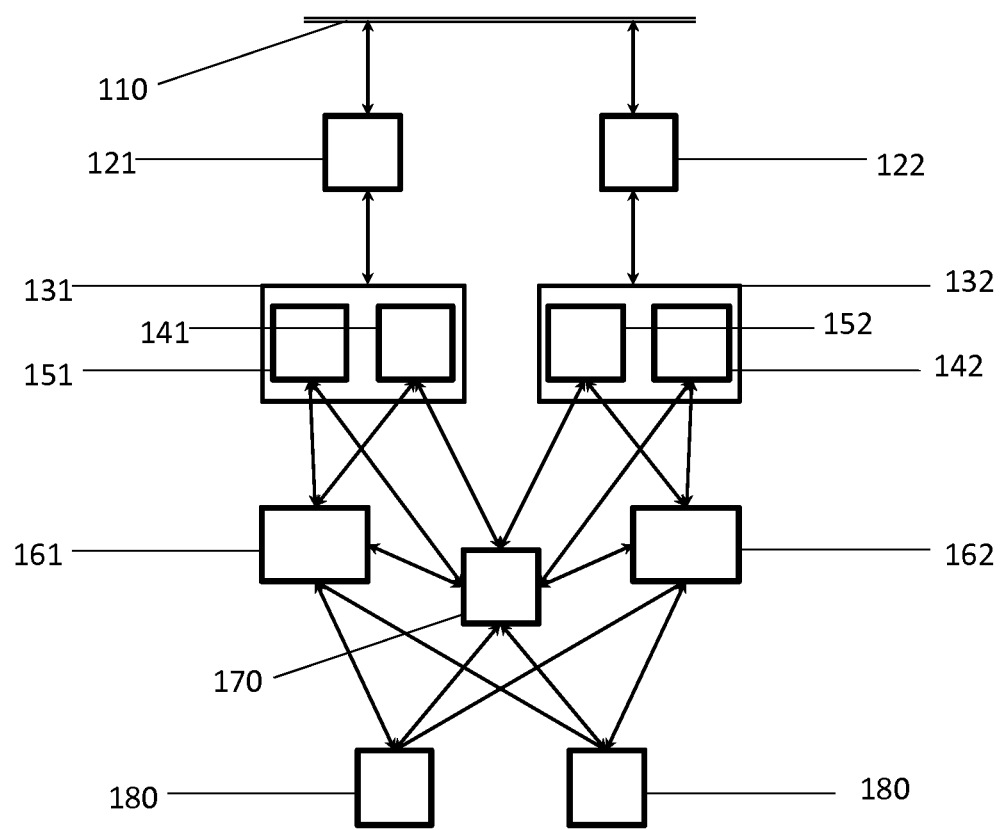
FIG. 1 shows a scheme of an anti-skid control system, as known in the state of art.

In FIG. 1, a scheme of an example of a control system, comprising the elements in charge of controlling the skidding of the wheels of the main landing gear is shown, as known in the state of the art.

In this scheme, the following elements are shown: a communication bus (111), a bus switch of side 1 (121), a bus switch of side 2 (122), an IMA computer of side 1 (131), comprising the Avionics Computer Control Device of side 1 (141) and the Avionics Computer Monitoring Device of side 1 (151), IMA computer of side 2 (132), comprising the Avionics Computer Control Device of side 2 (142) and the Avionics Computer Monitoring Device of side 2 (152), Anti-skid computer of side 1 (161), Anti-skid computer of side 2 (162), Emergency brake analogue box (171), and Main landing gear control (181).

The communication bus (111) is connected to the IMA computer of side 1 (131) and to the IMA computer of side 2 (132), by means of its respective switches (21, 22).

The IMA, Integrated Modular Avionics, is an architecture, i.e. a logic structure of a series of elements, used for controlling the several systems and elements which should be controlled in the normal operation of an aircraft. The IMA architecture is used to split the aircraft control in two sides: side 1 and side 2.

In all the systems known in the state of the art, each anti-skid computer is controlled from the IMA of the corresponding side. In FIG. 1, it can be seen how the IMA computer of side 1 (131) is connected downstream only to the emergency braking box (181) and with the anti-skid computer of the side 1 (161). The same structure is repeated with the elements in side 2. Accordingly, each anti-skid computer is responsible of controlling or monitoring the two hydro-mechanical circuit selector valves and servo-valves or electric brake actuators as well other brake equipment, such as pressure transducers, wheel speed transducers, etc.

These systems work as follows: the main landing gear needs an anti-skid control. The control of the whole landing gear can be carried out by any of two anti-skid computers. Each anti-skid computer is controlled only by the IMA computer of its corresponding side.

Each IMA computer comprises one control partition and one monitoring partition, so that only one control partition is active at the same time and one monitoring partition is active at the same time.

In the operation of the aircraft, the active control partition is therefore capable of carrying out the following functions: Receiving pedal demand from pedal transducers; Acquiring and sending cockpit signals as well as provides BACS Status to external systems through data Bus communication; Receiving data from other aircraft systems; Determining Air/Ground Status; Calculating pressure orders and transmits commands and information to the anti-skid computer; Receiving and processing anti-skid computer data; Acquiring commands and information from the active Monitoring partition; Detecting failures and providing failure information to the active Monitoring partition; Determining the transition between pedal/autobrake (if implemented)/retraction braking; and Inhibiting the Emergency Brake Analogue Box.

Furthermore, the active Monitoring partition may carry out the following functions: Receiving and processing anti-skid computer data; Acquiring cockpit signals and receives independent pedal positions for monitoring purposes; Acquiring/sending some signals from/to the other IMA computer side to discriminate which side is active; Receiving and processing signals from Control partition of its side; Determining Air/Ground Status independently; Inhibiting the Emergency Brake Analogue Box and checking its status; Protecting the aircraft from carrying out an uncommanded braking through selector valves and/or isolating electrical brake actuators; Sending commands and information to the active control partition; Receiving status of external power supplies (hydraulic or electrical) from their respective control computers or direct signaling; Detecting failures and reconfiguring the system; and Determining the Braking Mode (Normal/Alternate).

Figure 2:
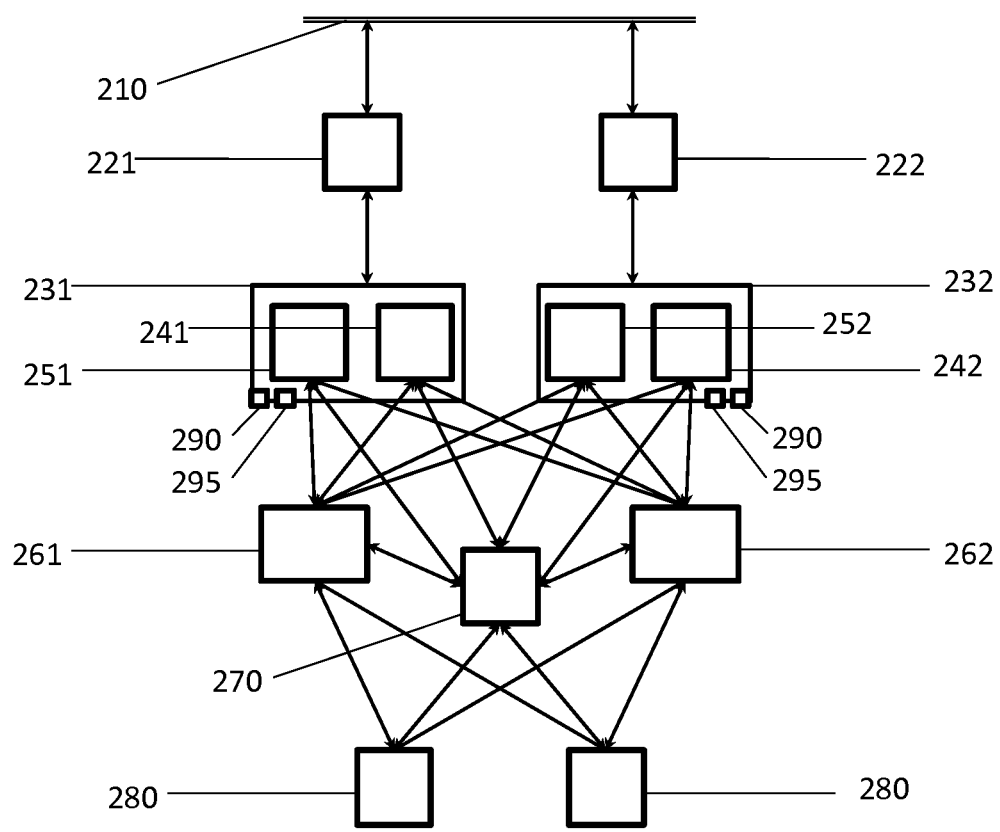
FIG. 2 shows a scheme of an anti-skid control system according to various embodiments.

FIG. 2 shows an example of one exemplary embodiment of a system according to the various teachings of the present disclosure. This system comprises the following elements: Communication bus (211); Bus switch of side 1 (221); Bus switch of side 2 (222); IMA computer of side 1 (231), comprising the Avionics Computer Control Device of side 1 (241) and the Avionics Computer Monitoring Device of side 1 (251); IMA computer of side 2 (232), comprising the Avionics Computer Control Device of side 2 (242) and the Avionics Computer Monitoring Device of side 2 (252); Anti-skid computer of side 1 (261); Anti-skid computer of side 2 (262); Emergency brake analogue box (271); Main landing gear control (281); Dual acquisition cards (291); and Dual microprocessor modules (295).

Dual acquisition cards (291), to acquire discrete and bus signals, are used to communicate IMA computers between each other, and each dual microprocessor module (295) comprised in the corresponding IMA side receive and process all the information from both anti-skid computers (261, 262), making each IMA computer (231, 232) able to receive discrete and analogue signals. Advantageously, this feature makes each IMA computer (231, 232) able to detect, in the case of failure, which anti-skid computer (261, 262) is failing.

The system also comprises connections between each IMA computer and both anti-skid computers.

Because of the connections between each IMA computer with both anti-skid computers and the presence of dual acquisition cards (291) and dual microprocessor modules (295), each IMA computer (231, 232) is thus also capable of carrying out two functions that none of the systems comprised in the state of the art performed: Determining which is the active anti-skid computer at each moment; and Activating-deactivating the anti-skid computers.

The determination of the active anti-skid computer is carried out by an information exchange between the active monitoring partition and each anti-skid computer. The active monitoring partition checks that there is not more than one active anti-skid computer at the same time.

Figure 3:
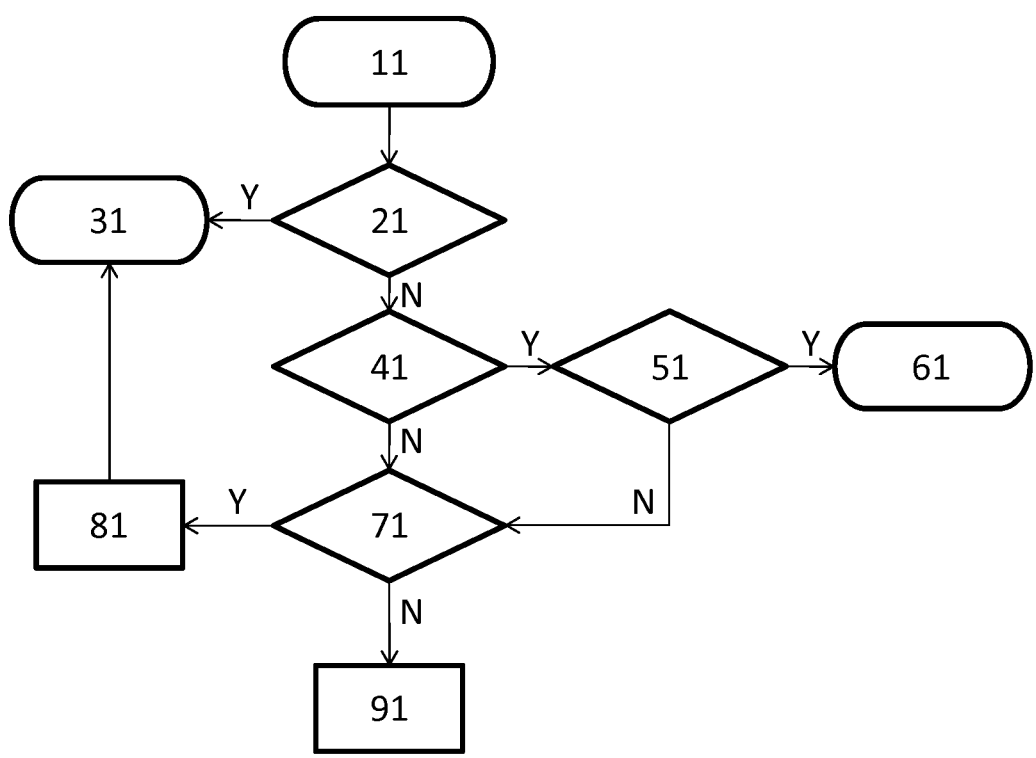
FIG. 3 shows a flow chart for a previously known method of dealing with a failure.

FIG. 3 shows the way of dealing with the failure known in the state of art. In that case, the fault processing (11) made the active monitoring partition (251, 252) check (21) if the IMA computer side was invalid or not. If the IMA computer side was invalid, the active monitoring partition (251, 252) deactivated (31) the IMA computer side. If the IMA computer side was not invalid, the active monitoring partition (251, 252) checked (41) if the IMA computer side was degraded or not. If the IMA computer side was degraded, the active monitoring partition (251, 252) checked (51) if the other IMA computer side was valid, deactivating (61) the IMA computer side if it was invalid or checking (71) whether the anti-skid computer was invalid if the IMA computer side was not degraded. If the anti-skid computer was invalid, the active monitoring partition (251, 252) invalidated (81) and deactivated (31) the IMA computer side. If the anti-skid computer was not invalid, the system continued working without reconfiguration (91).

Figure 4:
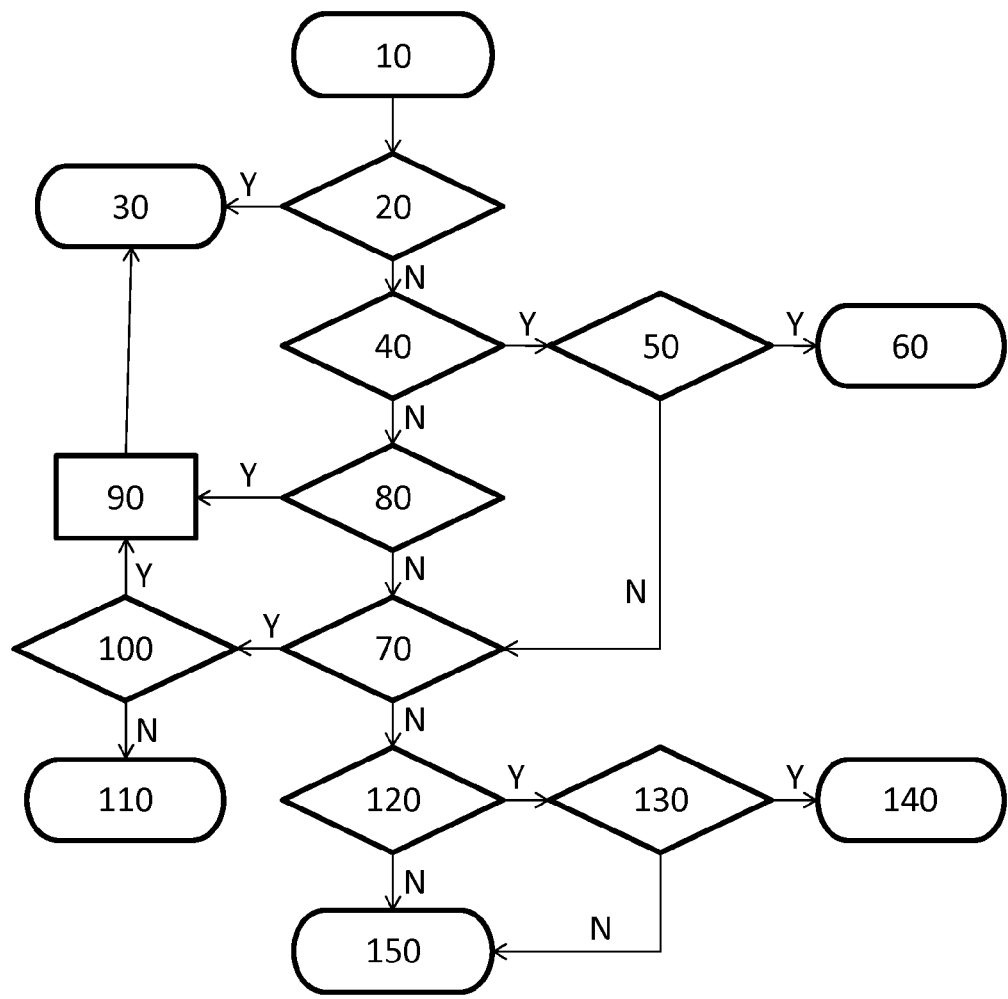
FIG. 4 shows a flow chart for a method of dealing with a failure according to various embodiments.

FIG. 4 shows the new way of carrying out this checking by a method according to the various teachings of the present disclosure. When a fault processing is detected (10), as this failure can be originated by a failure in one of IMA sides, first of all, the active monitoring partition (251, 252) determines (20) using data inputs whether the IMA computer side is invalid. If the IMA computer side turns out to be invalid, the active monitoring partition (251, 252) will deactivate (30) the IMA computer side. If the IMA computer side is not invalid, the active monitoring partition (251, 252) verifies (40) if the IMA computer side is degraded. If the IMA computer side turns out to be degraded, the active monitoring partition (251, 252) checks (50) if the other IMA computer side is valid, deactivating (60) first IMA computer side if the other IMA computer side is valid or checking (70) the active anti-skid computer if the other IMA computer is not valid. If the IMA computer side is not degraded, the active monitoring partition (251, 252) checks (80) if the "inactive anti-skid computer command" has been incorrect. If the command has been incorrect, the active monitoring partition (251, 252) invalidates (90) and then deactivates (30) the IMA computer side. If the command has not been incorrect, the active monitoring partition (251, 252) checks (70) the active anti-skid computer. If the active anti-skid computer is invalid, the active monitoring partition (251, 252) checks (100) the other anti-skid computer, invalidating (90) and then deactivating (30) the IMA computer side if the other anti-skid computer is invalid too, or reconfiguring (110) the system to the other anti-skid computer if said other anti-skid computer is not invalid. If the active anti-skid computer is not invalid, the active monitoring partition (251, 252) checks (120) if the active anti-skid computer is degraded. If the active anti-skid computer is degraded, the active monitoring partition (251, 252) checks (130) if the other anti-skid computer is valid, reconfiguring (140) the system to the other anti-skid computer if said other anti-skid computer is valid or not reconfiguring (150) the system if said other anti-skid computer is not valid. If the active anti-skid computer is not degraded, the active monitoring partition (251, 252) does not reconfigure (150) the system.

Throughout the entire document, an "invalid" element should be understood as an element failed with major faults, so that it should not be used. A "degraded" element is an element failed with minor faults in a way that is preferable to use a redundant element. A "valid" element is an element which is not failed.

The activation and deactivation is carried out by toggling discrete signals which are sent from the active monitoring partition to the anti-skid computers. If the anti-skid computers detect a present signal, it will become active. Similarly to other systems, anti-skid computer's activation signals are echoed to the active monitoring partition to determine possible mismatches.

In one exemplary embodiment, the checking of the degraded status of the IMA computer side is not present, so if the IMA computer is not invalid, the action carried out is directly checking (71) if the anti-skid computer is invalid or not.

Both the Inactive "Anti-skid Computer Incorrect Command" loop and the "Anti-skid computer invalid" loop are implemented to solve the new problems caused by the new structure of the control system described in the present disclosure.

In particular, the new links between the IMA computer side (231, 232) and the anti-skid computer of the cross side (262, 261) introduce the indetermination of stating which anti-skid computer (261, 262) is governed by which IMA computer side (231, 232). These problems are solved by the two loops described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A control system for anti-skid computers of an aircraft, the system comprising:
   a first integrated modular avionics computer of a first side of the aircraft, comprising a first Avionics Computer Control Device of the first side of the aircraft and a first Avionics Computer Monitoring Device of the first side of the aircraft, and including at least one first dual data acquisition means and at least one first dual processing means,
   a second integrated modular avionics computer of a second side of the aircraft, comprising a second Avionics Computer Control Device of the second side of the aircraft and a second Avionics Computer Monitoring Device of the second side of the aircraft, and including at least one second dual data acquisition means and at least one second dual processing means,
   a first Anti-skid computer of the first side of the aircraft,
   a second Anti-skid computer of the second side of the aircraft, and
   one or more main landing gear control elements;
   wherein the first Avionics Computer Control Device of the first side of the aircraft and the first Avionics Computer Monitoring Device of the first side of the aircraft are connected to the first Anti-skid computer of the first side of the aircraft, and the second Avionics Computer Control Device of the second side of the aircraft and the second Avionics Computer Monitoring Device of the second side of the aircraft are connected to the second Anti-skid computer of the second side of the aircraft, and
   wherein each of the first and second Avionics Computer Control Devices and each of the first and second Avionics Computer Monitoring Devices are further connected to the first and second anti-skid computers of the other of the first side and the second side.

2. The control system according to claim 1, further comprising at least one of these elements:
   at least one communication bus,
   a bus switch of the first side of the aircraft, connecting the first integrated modular avionics computer of the first side of the aircraft to the at least one communication bus, and
   a bus switch of the second side of the aircraft, connecting the second integrated modular avionics computer of the second side of the aircraft to the at least one communication bus.

3. The control system according to claim 1, further comprising an Emergency Brake Analogue Box connected with both of the first and second anti-skid computers, with both of the first and second Avionics Computer Control Devices and with both of the first and second Avionics Computer Monitoring Devices.

4. The control system according to claim 1, wherein the first and second anti-skid computers govern wheels of the main landing gear of the aircraft.

5. An aircraft, comprising:
   a control system for anti-skid computers of an aircraft including:
   a first integrated modular avionics computer associated with a first side of the aircraft, comprising a first Avionics Computer Control Device associated with the first side of the aircraft and a first Avionics Computer Monitoring Device associated with the first side of the aircraft, and including at least one first dual data acquisition means and at least one first dual processing means,
   a second integrated modular avionics computer associated with a second side of the aircraft, comprising a second Avionics Computer Control Device associated with the second side of the aircraft and a second Avionics Computer Monitoring Device associated with the second side of the aircraft, and including at least one second dual data acquisition means and at least one second dual processing means,
   a first Anti-skid computer associated with the first side of the aircraft,
   a second Anti-skid computer associated with the second side of the aircraft, and
   one or more main landing gear control elements;
   wherein the first Avionics Computer Control Device associated with the first side of the aircraft and the first Avionics Computer Monitoring Device associated with the first side of the aircraft are connected to the first Anti-skid computer of the first side of the aircraft, and the second Avionics Computer Control Device associated with the second side of the aircraft and the second Avionics Computer Monitoring Device associated with the second side of the aircraft are connected to the second Anti-skid computer of the second side of the aircraft, and
   wherein each of the first and the second Avionics Computer Control Device and each of the first and the second Avionics Computer Monitoring Device are further connected to the first and second anti-skid computers of the other of the first side and the second side and the first and second anti-skid computers govern wheels of the main landing gear of the aircraft.

6. The aircraft according to claim 5, further comprising at least one of these elements:
   at least one communication bus,
   a bus switch associated with the first side of the aircraft, connecting the first integrated modular avionics computer associated with the first side of the aircraft to the at least one communication bus, and
   a bus switch of associated with the second side of the aircraft, connecting the second integrated modular avionics computer associated with the second side of the aircraft to the at least one communication bus.

7. The aircraft according to claim 5, further comprising an Emergency Brake Analogue Box connected with both the first and the second anti-skid computers, with both the first and the second Avionics Computer Control Devices and with both the first and the second Avionics Computer Monitoring Devices.

* * * * *